United States Patent [19]

Jackson, Jr. et al.

[11] Patent Number: 5,260,409
[45] Date of Patent: Nov. 9, 1993

[54] LIQUID CRYSTALLINE POLYESTER

[75] Inventors: Winston J. Jackson, Jr., Kingsport, Tenn.; William R. Darnell, Weber City

[73] Assignee: Eastman Kodak Company, Rochester, N.Y.

[21] Appl. No.: 994,044

[22] Filed: Dec. 14, 1992

Related U.S. Application Data

[63] Continuation of Ser. No. 718,692, Jun. 21, 1991, abandoned.

[51] Int. Cl.$^5$ .................... C08G 63/02; C08G 65/38; C08G 63/00
[52] U.S. Cl. .................... 528/193; 528/176; 528/190; 528/194; 528/219
[58] Field of Search ............... 528/176, 190, 193, 194, 528/219

[56] References Cited

U.S. PATENT DOCUMENTS 4,067,852  1/1978  Calundann ........................ 260/47
4,169,933  10/1979  Jackson, Jr. et al. ........... 528/190

FOREIGN PATENT DOCUMENTS 0356226  2/1990  European Pat. Off. .

OTHER PUBLICATIONS

*Makromolekulare Chemie, Rapid Communications*, vol. 3, No. 1, pp. 23–27 (1982).

*Primary Examiner*—John Kight, III
*Assistant Examiner*—T. Mosley
*Attorney, Agent, or Firm*—Betty J. James; Tom R. Savitsky; William P. Heath, Jr.

[57] ABSTRACT

The present invention relates to liquid crystalline polyesters which have surprisingly low isotropic transition temperatures. The invention further relates to a new process for preparing containers which have more uniform properties made from certain liquid crystalline polyesters. Also, the present invention relates to molded objects comprising certain liquid crystalline polyesters. The liquid crystalline polyesters disclosed herein are derived from 2,6-naphthalenedicarboxylic acid, 4,4'-biphenol, hydroquinone, and p-hydroxybenzoic acid.

19 Claims, No Drawings

LIQUID CRYSTALLINE POLYESTER

This is a continuation of copending application Ser. No. 07/718,692 filed on Jun. 21, 1991, now abandoned.

FIELD OF INVENTION

This invention concerns certain liquid crystalline polyesters having a low isotropic transition temperature.

BACKGROUND OF THE INVENTION

It is well known in the art that liquid crystalline polyesters (LCP's) give anisotropic mechanical properties when injection molded or extruded. This behavior can be attributed to processing the LCP in its liquid crystalline or thermotropic state, resulting in the molded or extruded article being highly oriented with very high mechanical properties in the direction of flow and poorly oriented with low properties across the direction of flow. Such properties are said to be anisotropic.

The isotropic transition temperature of a polymer is the temperature at which the polymer melt changes from an opaque, thermotropic, anisotropic state to a clear, isotropic state. For some applications, it would be highly advantageous if polyester compositions were available which had isotropic transition temperatures low enough for them to be processed in their isotropic state. Such compositions should give much less anisotropic properties under certain processing conditions.

U.S. Pat. No. 4,067,852 broadly discloses certain melt processable, wholly aromatic polyesters, but no mention is made of low isotropic transition temperatures. Additionally, European Patent Application 0,356,226 discloses certain aromatic polyesters and polyester amides, but again, no mention is made of low isotropic transition temperatures.

SUMMARY OF THE INVENTION

The present invention relates to new LCP's which have surprisingly low isotropic transition temperatures. The invention further relates to a new process for preparing containers made from certain liquid crystalline polyesters which have more uniform properties. Also, the present invention relates to molded objects comprising certain liquid crystalline polyesters.

DETAILED DESCRIPTION OF THE INVENTION

The present invention provides all-aromatic, liquid crystalline polyester compositions which have surprisingly low isotropic transition temperatures even though all chemical bonds between repeating units are either opposite and coaxial or opposite and parallel. The invention concerns all-aromatic, liquid crystalline compositions based on 2,6-naphthalenedicarboxylic acid, 4,4'-biphenol, hydroquinone, and p-hydroxybenzoic acid in molar amounts such that the isotropic transition temperatures of the resulting polyesters are less than 380° C. and are typically equal to or less than about 350° C. The chemical bonds extending from the 2,6-naphthalenedicarboxylic acid repeating units are opposite and parallel, and the bonds extending from the 4,4'-biphenol, hydroquinone, and p-hydroxybenzoic acid units are opposite and coaxial. The advantage of the bonds between repeating units being either opposite and parallel or opposite and coaxial is that a higher degree of crystallinity (and, therefore, higher heat distortion temperature) can be obtained than in compositions containing kinking units in the chain (such as isophthalic acid).

The liquid crystalline polyesters of the invention comprise repeating units from:
(a) 2,6-naphthalenedicarboxylic acid,
(b) 4,4'-biphenol,
(c) hydroquinone, and
(d) p-hydroxybenzoic acid,
wherein the molar ratio of (a) is about 0.2 to about 0.4, the molar ratio of (b) is about 0.1 to about 0.3, the molar ratio of (c) is about 0.05 to about 0.3, the molar ratio of (d) is about 0.6 to about 0.8, the molar ratio of (a) is equal to the molar ratio of (b) plus (c), and the molar ratio of (a) plus (d) is equal to 1.0, and wherein said liquid crystalline polyester has an isotropic transition temperature of less than 380° C., provided that said liquid crystalline polyester is not a polyester consisting of:
(a), at a molar ratio of 0.30,
(b), at a molar ratio of 0.15,
(c), at a molar ratio of 0.15, and
(d), at a molar ratio of 0.70.

The LCP's of the invention typically have an inherent viscosity of at least 2, and preferably 2 to 6, as determined in a 60/40 weight/weight solution of pentafluorophenol/1,2,4-trichlorobenzene at 25° C. at a concentration of 0.1 g polyester per 100 ml solvent.

Preferred LCP's of the invention are as follows:
wherein the molar ratio of (a) is about 0.4, the molar ratio of (b) is about 0.2, the molar ratio of (c) is about 0.2, and the molar ratio of (d) is about 0.6,
wherein the molar ratio of (a) is about 0.4, the molar ratio of (b) is about 0.3, the molar ratio of (c) is about 0.1, and the molar ratio of (d) is about 0.6,
wherein the molar ratio of (a) is about 0.4, the molar ratio of (b) is about 0.25, the molar ratio of (c) is about 0.15, and the molar ratio of (d) is about 0.6,
wherein the molar ratio of (a) is about 0.4, the molar ratio of (b) is about 0.15, the molar ratio of (c) is about 0.25, and the molar ratio of (d) is about 0.6,
wherein the molar ratio of (a) is about 0.4, the molar ratio of (b) is about 0.1, the molar ratio of (c) is about 0.3, and the molar ratio of (d) is about 0.6,
wherein the molar ratio of (a) is about 0.3, the molar ratio of (b) is about 0.15, the molar ratio of (c) is about 0.15, and the molar ratio of (d) is about 0.7, and
wherein the molar ratio of (a) is about 0.2, the molar ratio of (b) is about 0.1, the molar ratio of (c) is about 0.1, and the molar ratio of (d) is about 0.8.

The LCP's of the invention can be prepared by conventional melt- and solid-state acidolysis methods, such as from the free acids and lower aliphatic monocarboxylic acid esters of the aromatic hydroxyl groups involved. Such methods are generally disclosed in U.S. Pat. No. 4,169,933, incorporated herein by reference.

The all aromatic LCP's of the invention having isotropic transition temperatures of 350° C. or less have utility in processes where they can be processed above their isotropic transition temperature in the isotropic state so that the mechanical properties of the finished item are more uniform (less anisotropic) in all directions. Thus, the present invention is also directed to a process for preparing a container comprising:
(A) extruding a liquid crystalline polyester comprising repeating units from:

(a) 2,6-naphthalenedicarboxylic acid,
(b) 4,4'-biphenol,
(c) hydroquinone, and
(d) p-hydroxybenzoic acid, wherein the molar ratio of (a) is about 0.2 to about 0.4, the molar ratio of (b) is about 0.1 to about 0.3, the molar ratio of (c) is about 0.05 to about 0.3, the molar ratio of (d) is about 0.6 to about 0.8, the molar ratio of (a) is equal to the molar ratio of (b) plus (c), and the molar ratio of (a) plus (d) is equal to 1.0, and wherein said liquid crystalline polyester has an isotropic transition temperature of 380° C. or less, above its isotropic transition temperature to form a parison, (B) holding the parison formed by step (A) above its isotropic transition temperature for a time sufficient to relax the polyester to result in a parison less oriented than before relaxation, and (C) blow molding a container from the parison of step (B) while the parison is in the isotropic state.

This process for preparing a container is preferably performed at a temperature of about 300° C. to about 350° C. It is further preferred that the container is a bottle. By the term "relax" and cognatic terms thereof is meant that the degree of polymer chain alignment, possibly introduced during initial stages of processing, assumes a less aligned (more random coil) configuration.

Although the above described method for preparing a container is a preferred embodiment of the invention, the present invention is also directed to molded objects regardless of the specific methodology employed for their preparation. Such molded objects comprise a liquid crystalline polyester comprising repeating units from:
(a) 2,6-naphthalenedicarboxylic acid,
(b) 4,4'-biphenol,
(c) hydroquinone, and
(d) p-hydroxybenzoic acid, wherein the molar ratio of (a) is about 0.2 to about 0.4, the molar ratio of (b) is about 0.1 to about 0.3, the molar ratio of (c) is about 0.05 to about 0.3, the molar ratio of (d) is about 0.6 to about 0.8, the molar ratio of (a) is equal to the molar ratio of (b) plus (c), and the molar ratio of (a) plus (d) is equal to 1.0, and wherein said liquid crystalline polyester has an isotropic transition temperature of 380° C. or less. Of course, it is preferred that the molded object is a parison, or a container made from the parison such as a bottle.

This invention is illustrated by the following examples but should not be interpreted as a limitation thereon.

EXAMPLES

In the examples, the inherent viscosities (I. V.'s) are determined in 60/40 w/w pentafluorophenol/1,2,4-trichlorobenzene at 25° C. and 0.1 g/100 mL in a Schott Gerate viscometer. The polymers are dissolved at 25° C. The isotropic transition temperatures are determined on a Fisher-Johns Hot Stage apparatus and are defined as the temperature at which the molten polymer observably changes from an opaque, thermotropic, anisotropic state to a mostly clear, isotropic state. Films are melt-pressed using dry polymer in a Hannafin press at the final temperature used in the preparation of the polyester.

EXAMPLE 1

This example illustrates the preparation of one liquid crystalline polyester which has an isotropic transition temperature less than 350° C.

To a 1000-mL, single necked flask equipped with stainless steel stirrer, provisions for maintaining a nitrogen atmosphere and applying vacuum, and a trap system for removing the volatiles from the polymerization are added 40.50 grams (0.15 mole) 4,4'-biphenol diacetate, 36.63 grams (0.165 mole) p-phenylene diacetate, 64.80 grams (0.30 mole) 2,6-naphthalene-dicarboxylic acid, and 81.00 grams (0.45 mole) p-acetoxybenzoic acid. The flask is then evacuated and purged three times with nitrogen, a slow nitrogen sweep of the flask contents is begun, and the flask is partly immersed in a metal bath maintained at 280° C. After the starting materials are mostly melted, stirring is begun. The mixture is heated at 280° C. for 65 minutes, at 300° C. for 60 minutes, and at 340° C. for 15 minutes. The polymerization mixture is an opaque, low melt viscosity material at this time. Vacuum is then applied from atmospheric to <0.5 torr during 10 minutes, and stirring is continued for 65 minutes to obtain a very high melt viscosity product. After being cooled to 25° C., the polymer is opaque-tan, gives a very tough melt-pressed film, and has an I. V. of 2.70. The isotropic transition temperature ($T_i$) of the polyester is 290°–295° C.

COMPARATIVE EXAMPLE 2

This example illustrates the very high isotropic transition temperature obtained when the liquid crystalline polyester is prepared from four monomers (only one of which is different from the four monomers used to prepare the compositions of the invention) which give only opposite and coaxial or opposite and parallel bonds in the polyester chain; but, in contrast to the compositions of the invention, the isotropic transition temperature is still very high.

Example 1 is repeated using a final buildup temperature of 370° C. and the following starting materials:
28.22 grams (0.170 mole) terephthalic acid
36.72 grams (0.170 mole) 2,6-naphthalenedicarboxylic acid
83.03 grams (0.374 mole) p-phenylene dipropionate
91.80 grams (0.510 mole) p-acetoxybenzoic acid The polymer thus prepared has an I. V. of 7.66, has an isotropic transition temperature of >420° C., and gives a very tough, melt pressed film.

COMPARATIVE EXAMPLE 3

This example illustrates the very high isotropic transition temperature obtained when the polyester is prepared from only 2,6-naphthalenedicarboxylic acid, 4,4'-biphenol diacetate, and p-acetoxybenzoic acid (no p-phenylene dipropionate used).

Example 1 is repeated using 400° C. as the final buildup temperature and the following starting materials:
64.80 grams (0.300 mole) 2,6-naphthalenedicarboxylic acid
81.00 grams (0.300 mole) 4,4'-biphenol diacetate
81.00 grams (0.450 mole) p-acetoxybenzoic acid The polymer thus prepared has an I. V. of 7.48, has an isotropic transition temperature of >420° C., and gives a very tough melt pressed film.

COMPARATIVE EXAMPLE 4

This example illustrates the very high isotropic transition temperature obtained when the polyester is prepared from only 2,6-naphthalenedicarboxylic acid, p-phenylene dipropionate, and p-acetoxybenzoic acid (no 4,4'-biphenol diacetate used).

Example 1 is repeated using 390° C. as the final buildup temperature and the following starting materials:

69.12 grams (0.320 mole) 2,6-naphthalenedicarboxylic acid
78.14 grams (0.352 mole) p-phenylene dipropionate
86.40 grams (0.480 mole) p-acetoxybenzoic acid The polymer thus prepared has an I. V. of 5.96, has an isotropic transition temperature of >420° C., and gives a very tough melt pressed film.

COMPARATIVE EXAMPLES 5–9

Comparative Examples 5–9 illustrate other liquid crystalline polyesters outside the scope of the present invention which have high isotropic transition temperatures. The polyesters were prepared using techniques similar to those disclosed in Examples 1–4.

EXAMPLES 10–15

Example 1 is repeated except using different amounts of the same starting materials and various final buildup temperatures between 340° C. and 380° C., as required, to prepare various high melt viscosity, liquid crystalline polyesters having the $T_i$'s indicated in Table 1. The data for the other examples are also given for comparison.

Examples 10–15 illustrate that liquid crystalline polyester compositions having low isotropic transition temperatures can be prepared containing a certain range of monomer segments derived from 2,6-naphthalenedicarboxylic acid, 4,4'-biphenol, hydroquinone, and p-hydroxybenzoic acid.

Table 1 uses the following nomenclature:

'N' = mole ratio of repeat units derived from 2,6-naphthalenedicarboxylic acid.
'HQ' = mole ratio of repeat units derived from hydroquinone.
'BP' = mole ratio of repeat units derived from 4,4'-biphenol.
'PHB' = mole ratio of repeat units derived from p-hydroxybenzoic acid.
'T' = mole ratio of repeat units derived from terephthalic acid.

TABLE 1

| Example # | 'N' | 'T' | 'HQ' | 'BP' | 'PHB' | $T_i$,°C. |
|---|---|---|---|---|---|---|
| 1 | 0.40 | None | 0.20 | 0.20 | 0.60 | About 295 |
| Comparative 2 | 0.20 | 0.20 | 0.40 | None | 0.60 | >420 |
| Comparative 3 | 0.40 | None | None | 0.40 | 0.60 | >420 |
| Comparative 4 | 0.40 | None | 0.40 | None | 0.60 | >420 |
| Comparative 5 | 0.50 | None | 0.25 | 0.25 | 0.50 | >420 |
| Comparative 6 | 0.60 | None | 0.30 | 0.30 | 0.40 | >420 |
| Comparative 7 | 0.40 | None | 0.05 | 0.35 | 0.60 | >420 |
| Comparative 8 | 0.20 | None | None | 0.20 | 0.80 | >420 |
| Comparative 9 | 0.15 | 0.15 | 0.15 | 0 15 | 0.70 | >420 |
| 10 | 0.40 | None | 0.10 | 0.30 | 0.60 | About 310 |
| 11 | 0.40 | None | 0.15 | 0.25 | 0.60 | About 305 |
| 12 | 0.40 | None | 0.25 | 0.15 | 0.60 | About 320 |
| 13 | 0.40 | None | 0.30 | 0.10 | 0.60 | About 345 |
| 14 | 0.30 | None | 0.15 | 0.15 | 0.70 | About 350 |
| 15 | 0.20 | None | 0.10 | 0.10 | 0.80 | About 335 |

NOTES:
1. 'N' + 'T' = 'HQ' + 'BP'.
2. 'N' + 'T' + 'PHB' = 1.0.

The invention has been described in detail with particular reference to preferred embodiments thereof, but it will be understood that variations and modifications can be effected within the spirit and scope of the invention.

We claim:

1. A liquid crystalline polyester consisting essentially of repeating units from:
    (a) 2,6-naphthalenedicarboxylic acid,
    (b) 4,4'-biphenol,
    (c) hydroquinone, and
    (d) p-hydroxybenzoic acid,
    wherein the molar ratio of (a) is about 0.2 to about 0.4, the molar ratio of (b) is about 0.1 to about 0.3, the molar ratio of (c) is about 0.05 to about 0.3, the molar ratio of (d) is about 0.6 to about 0.8, the molar ratio of (a) is equal to the molar ratio of (b) plus (c), and the molar ratio of (a) plus (d) is equal to 1.0, and wherein said liquid crystalline polyester has an isotropic transition temperature of less than 380° C.,
    provided that said liquid crystalline polyester is not a polyester consisting of:
    (a), at a molar ratio of 0.30,
    (b), at a molar ratio of 0.15,
    (c), at a molar ratio of 0.15, and
    (d), at a molar ratio of 0.70.

2. The liquid crystalline polyester of claim 1 having an isotropic transition temperature of about 350° C. or less.

3. The liquid crystalline polyester of claim 1 having an inherent viscosity of at least 2 as determined in a 60/40 weight/weight solution of pentafluorophenol/1,2,4-trichlorobenzene at 25° C. at a concentration of 0.1 g polyester per 100 ml solvent.

4. The liquid crystalline polyester of claim 1 having an inherent viscosity of 2 to 6 as determined in a 60/40 weight/weight solution of pentafluorophenol/1,2,4-trichlorobenzene at 25° C. at a concentration of 0.1 g polyester per 100 ml solvent.

5. The liquid crystalline polyester of claim 1 wherein the molar ratio of (a) is about 0.4, the molar ratio of (b) is about 0.2, the molar ratio of (c) is about 0.2, and the molar ratio of (d) is about 0.6.

6. The liquid crystalline polyester of claim 1 wherein the molar ratio of (a) is about 0.4, the molar ratio of (b) is about 0.3, the molar ratio of (c) is about 0.1, and the molar ratio of (d) is about 0.6.

7. The liquid crystalline polyester of claim 1 wherein the molar ratio of (a) is about 0.4, the molar ratio of (b) is about 0.25, the molar ratio of (c) is about 0.15, and the molar ratio of (d) is about 0.6.

8. The liquid crystalline polyester of claim 1 wherein the molar ratio of (a) is about 0.4, the molar ratio of (b) is about 0.15, the molar ratio of (c) is about 0.25, and the molar ratio of (d) is about 0.6.

9. The liquid crystalline polyester of claim 1 wherein the molar ratio of (a) is about 0.4, the molar ratio of (b)

is about 0.1, the molar ratio of (c) is about 0.3, and the molar ratio of (d) is about 0.6.

10. The liquid crystalline polyester of claim 1 wherein the molar ratio of (a) is about 0.3, the molar ratio of (b) is about 0.15, the molar ratio of (c) is about 0.15, and the molar ratio of (d) is about 0.7.

11. The liquid crystalline polyester of claim 1 wherein the molar ratio of (a) is about 0.2, the molar ratio of (b) is about 0.1, the molar ratio of (c) is about 0.1, and the molar ratio of (d) is about 0.8.

12. A molded object comprising a liquid crystalline polyester comprising repeating units from:
  (a) 2,6-naphthalenedicarboxylic acid,
  (b) 4,4'-biphenol,
  (c) hydroquinone, and
  (d) p-hydroxybenzoic acid,
  wherein the molar ratio of (a) is about 0.2 to about 0.4, the molar ratio of (b) is about 0.1 to about 0.3, the molar ratio of (c) is about 0.05 to about 0.3, the molar ratio of (d) is about 0.6 to about 0.8, the molar ratio of (a) is equal to the molar ratio of (b) plus (c), and the molar ratio of (a) plus (d) is equal to 1.0, and wherein said liquid crystalline polyester has an isotropic transition temperature of 380° C. or less.

13. The molded object of claim 11 which is a parison.

14. The molded object of claim 11 which is a container.

15. The molded object of claim 12 wherein said liquid crystalline polyester has an isotropic transition temperature of less than about 350° C.

16. A process for preparing a container comprising:
  (A) extruding a liquid crystalline polyester comprising repeating units from:
    (a) 2,6-naphthalenedicarboxylic acid,
    (b) 4,4'-biphenol,
    (c) hydroquinone, and
    (d) p-hydroxybenzoic acid,
    wherein the molar ratio of (a) is 0.2 to 0.4, the molar ratio of (b) is 0.1 to 0.3, the molar ratio of (c) is 0.05 to 0.3, the molar ratio of (d) is 0.6 to 0.8, the molar ratio of (a) is equal to the molar ratio of (b) plus (c), and the molar ratio of (a) plus (d) is equal to 1.0, and wherein said liquid crystalline polyester has an isotropic transition temperature of 380° C. or less, above its isotropic transition temperature to form a parison,
  (B) holding the parison formed by step (A) above its isotropic transition temperature for a time sufficient to relax the polyester to result in a parison less oriented than before relaxation, and
  (C) blow molding a container from the parison of step (B) while the parison is in the isotropic state.

17. The process of claim 16 carried out at a temperature of about 300° C. to about 350° C.

18. The process of claim 16 wherein said container is a bottle.

19. The process of claim 16 wherein said liquid crystalline polyester has an isotropic transition temperature of less than about 350° C.

* * * * *